(12) United States Patent
Hodas

(10) Patent No.: US 10,031,965 B2
(45) Date of Patent: Jul. 24, 2018

(54) DATA OBJECT CLASSIFICATION USING FEATURE GENERATION THROUGH CROWDSOURCING

(71) Applicant: Battelle Memorial Institute, Richland, WA (US)

(72) Inventor: Nathan O. Hodas, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 855 days.

(21) Appl. No.: 14/541,618

(22) Filed: Nov. 14, 2014

(65) Prior Publication Data

US 2016/0140212 A1 May 19, 2016

(51) Int. Cl.
*G06F 17/30* (2006.01)

(52) U.S. Cl.
CPC .. *G06F 17/30601* (2013.01); *G06F 17/30061* (2013.01); *G06F 17/30271* (2013.01); *G06F 17/30705* (2013.01)

(58) Field of Classification Search
CPC ........ G06F 17/30061; G06F 17/30271; G06F 17/30601; G06F 17/30705
See application file for complete search history.

(56) References Cited

U.S. PATENT DOCUMENTS

| | | | |
|---|---|---|---|
| 2011/0214044 A1* | 9/2011 | Davis ................ | G06T 11/00 715/201 |
| 2013/0046789 A1* | 2/2013 | Lulew cz ............ | G06T 11/206 707/792 |
| 2013/0129196 A1* | 5/2013 | Paris ................. | G06K 9/62 382/155 |
| 2015/0096026 A1* | 4/2015 | Kolacinski ........ | G06F 21/55 726/23 |

* cited by examiner

*Primary Examiner* — Dinku Gerbresenbet
(74) *Attorney, Agent, or Firm* — Klarquist Sparkman, LLP

(57) ABSTRACT

In a computing device that implements a data object classification tool, a method for classifying data may include detecting change in spatial coordinates for each of at least two of a set of data objects within a canvas space. Each of the data objects may be associated with a vector of features. A rule set may be generated based on the vector of features associated with each of the at least two data objects. The rule set may use feature(s) that explain the changed spatial coordinates. The data objects may be selectively rearranged within the canvas space by applying the generated rule set to any remaining data objects among the set of data objects so as to assign spatial coordinates to the remaining objects. For each of the data objects, the spatial coordinates may be stored as new semantic feature(s) within the vector of features for that data object.

20 Claims, 12 Drawing Sheets
(4 of 12 Drawing Sheet(s) Filed in Color)

DATA OBJECT CLASSIFICATION USING FEATURE GENERATION THROUGH CROWDSOURCING

STATEMENT AS TO RIGHTS TO INVENTIONS MADE UNDER FEDERALLY-SPONSORED RESEARCH AND DEVELOPMENT

This invention was made with government support under Contract DE-AC05-76RL01830, awarded by the U.S. Department of Energy. The government has certain rights in the invention.

BACKGROUND

As enterprises accumulate ever-greater amounts of data on their transactions, processes, products, and operations, online analytical and data classification processing has become an important part of computing activities. The number of tools and techniques addressing analytical processing has grown, enabling data analysts to quickly analyze, navigate through, and classify vast and complex collections of data using processing software and platforms.

Visual data exploration enables users to gain insights into their data by supporting an interactive discourse with their information. Users can engage in sense-making tasks through the iterative testing of assertions and hypotheses supported by their domain expertise. The ability to visualize, interact with, and classify information is critical to the success of such visual analytic systems. As the scale of data sets increase, it may be challenging to evolve both the visual and interaction paradigms to perform efficient classification of data objects.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, a method, implemented at least in part by a computing device, for classifying data may include detecting change in spatial coordinates for each of at least two of a set of data objects within a canvas such as a two-dimensional canvas space. Each of the set of data objects may be associated with a vector of features. A rule set may be generated based on the vector of features associated with each of the at least two data objects. The rule set may use one or more features that explain the changed spatial coordinates. The data objects may be selectively rearranged within the canvas space by applying the generated rule set to any remaining data objects among the set of data objects so as to assign spatial coordinates to the remaining data objects. For each of the data objects, the spatial coordinates may be stored as one or more new semantic features within the vector of features for that data object.

In another aspect of the disclosure, a computer-readable storage is disclosed and may include instructions for classifying data. A method specified by the instructions may include receiving input for moving at least two of a set of data objects within a canvas such as a two-dimensional canvas space. Each of the set of data objects may be associated with a vector of machine-generated features and/or semantic features. Change in spatial coordinates may be determined for each of the moved at least two data objects. Values of features among the machine-generated features and/or semantic features for the at least two data objects may be correlated with the changed spatial coordinates. A rule set may be generated based on the correlating. The rule set may use one or more features that explain the changed spatial coordinates. The data objects may be selectively rearranged within the canvas space by applying the generated rule set to any remaining data objects among the set of data objects so as to assign spatial coordinates to the remaining data objects. For each of the data objects, the spatial coordinates may be stored as one or more new semantic features within the vector of features for that data object.

In yet another aspect of the disclosure, a computing device that includes a processor and a memory, may implement a data object classification tool (DOCT). The DOCT may include a U/I engine configured to receive input for moving at least two of a set of data objects within a canvas such as a two-dimensional canvas space. Each of the set of data objects may be associated with a vector of machine-generated features and/or semantic features. A classification engine may be configured to determine change in spatial coordinates for each of the moved at least two data objects. The classification engine may also be configured to determine one or more common features among the vector of features associated with co-located ones of the at least two data objects, and to generate a rule set based on the one or more common features. The rule set may use one or more features that explain the changed spatial coordinates. A canvas rendering engine may be configured to selectively rearrange data objects within the canvas space by applying the generated rule set to any remaining data objects among the set of data objects so as to assign spatial coordinates to the remaining data objects. The U/I engine may also be configured to detect a confirmation of spatial coordinates for the rearranged data objects. Finally, a features engine may be configured to store, for each of the data objects, the confirmed spatial coordinates as one or more new semantic features within the vector of features for that data object.

As described herein, a variety of other features and advantages can be incorporated into the technologies as desired.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
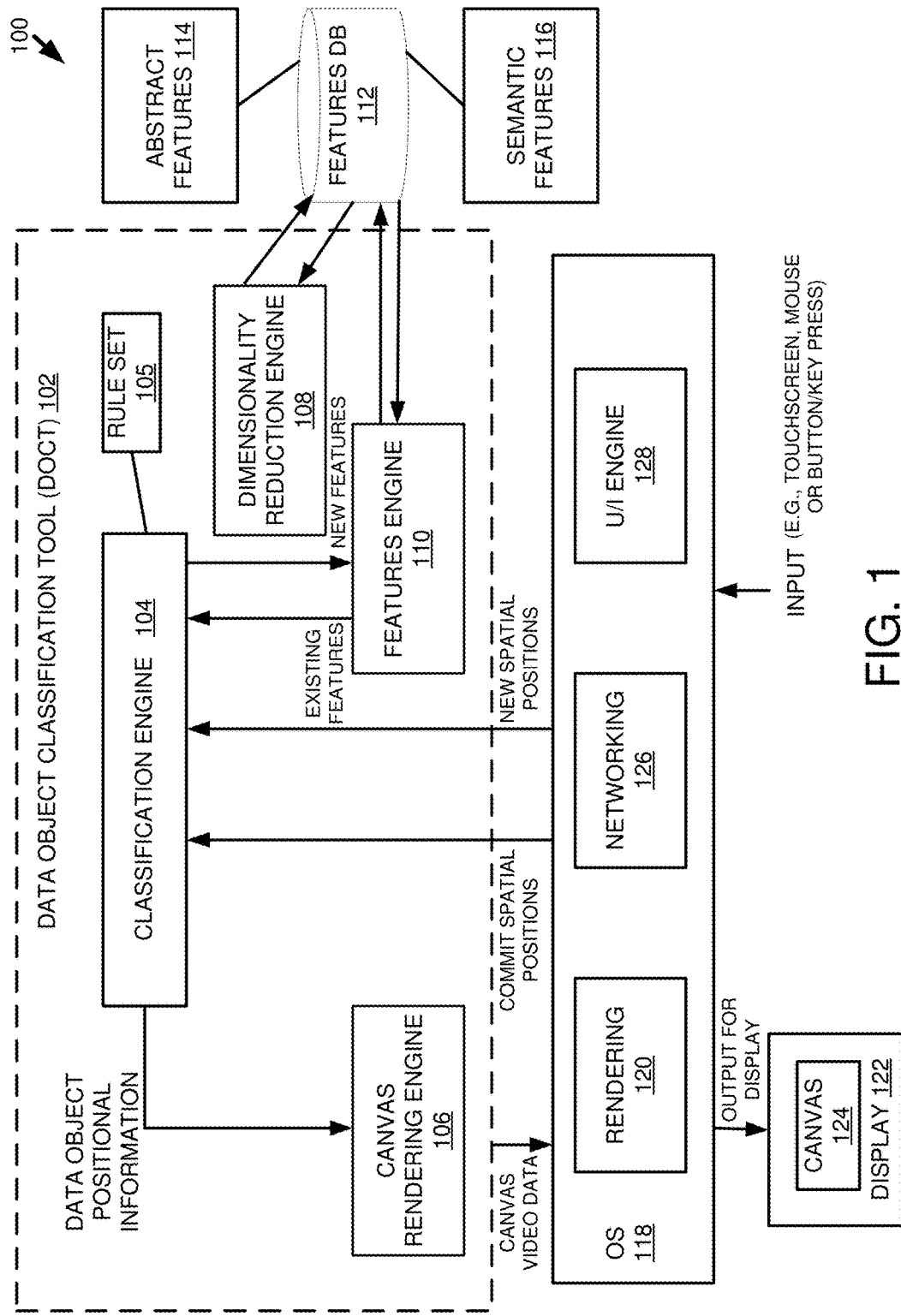
FIG. 1 is a block diagram illustrating an example software architecture for a data object classification tool (DOCT) using feature generation through crowdsourcing, in accordance with an example embodiment of the disclosure.

The technologies described herein can be used in a data object classification tool (DOCT), which may use an information theoretic feedback-loop to allow the user to rapidly position and classify many documents or items. In addition, the tool may allow multiple users to work together to train the DOCT to learn many rich, semantic features not present in the raw data, further accelerating the information discovery process. In some instances, the data object classification tool may use a free-form two-dimensional canvas to arrange data objects, such as text, images, and/or media, according to a user's mental model. More specifically, the two-dimensional canvas may use theoretic tools to infer the user's mental model, estimate the features the user is relying on when one or more of the data objects are moved/rearranged by the user, and then predict (e.g., by determining new spatial coordinates of the objects within the canvas) where new, untouched (unmoved) data objects should be placed on the canvas. The unmoved data objects may then be rearranged based on the predicted spatial coordinates, and the spatial coordinates may be stored as part of a features profile for each of the data objects.

In this regard, the data object classification tool allows for multiple people to "crowdsource" feature generation, suggesting alternative features to the user. The user may interact with the canvas, where he positions icons representing pieces of data. The data objects can be heterogeneous, e.g., some of the icons can represent image objects, while others could be text objects, audio objects, and so forth. Heterogeneous data objects may also be classified by allowing the user to position data objects to generate a common spatial metaphor (e.g., pictures of frogs may be placed together with images of frogs). After the user positions items on the screen to his satisfaction, the user may commit the X/Y coordinates of each icon to a central database (e.g., by activating a software button in a user interface), where the spatial positions are added as a latent (or semantic) feature to each item. The user may also request new, untouched data objects be added to the canvas, and the DOCT positions each new item according the pattern it has learned from the original data objects. In some instances, the data object classification tool may be used to refine the initial pattern (or rule set) generated from the original data objects. The DOCT may use information theoretic measures to determine which features in the database best explain how the user positioned the icons on the screen. The DOCT may then incrementally optimize the positions on the screen to show further application of the features it isolated. The user can then adjust the positions to correct the DOCT, or the user can request additional refinement to further optimize the positions.

Different users can use the DOCT. A given user moves data objects on the canvas space and evaluates a generated rule set, and the DOCT stores semantic features for the data objects based on the user input and feedback. Or, in different sessions, a single user can move data objects on the canvas space and evaluate a generated rule set, and the DOCT stores semantic features for the data objects based on the input and feedback provided by the user in the session. Previously assigned semantic features can be stored along with machine-generated features, and then used by the DOCT when generating a rule set. Therefore, a user can benefit from the input and feedback provided by earlier users or DOCT sessions. In this way, by incorporating user feedback and crowdsourced features, the DOCT reduces the time required to develop a comprehensive classification scheme for large amounts of data. In each round with the DOCT, a user (the same user or a different user) might apply a new latent mental model or a latent mental model similar to one previously applied. Either way, the set of features for data objects can be enriched by adding new semantic features.

One approach to determining the "ground truth" in a classification scheme is for a user to label a set of data objects with metadata. For a large set of data objects, this labeling process can be time-consuming and potentially unreliable. At the other extreme, feature generation tools can quickly generate features about data objects, but the machine-generated features can be abstract—not having any real-world explanation or significance—and difficult for a user to apply in a classification scheme. Using machine-generated features and previously-assigned semantic features of data objects, a DOCT as described herein can infer rules that a user applies when classifying data objects, without the user expressly specifying the rules. In many cases, the DOCT can quickly and reliably determine a rule set that closely approximates the rules applied by a user.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

As used herein, the term "data object" can include one or more of a text object (e.g., a text file or an image of a text article), an image object (e.g., an image file), and a media object (e.g., an audio file or a video file). As used herein, the term "canvas space" can include a free-form two-dimensional space (such as a desktop space managed by a computing device and used for displaying and classifying data objects) or another space (such as a one-dimensional space a three-dimensional space, or a 2.1-dimensional space, which is a two-dimensional space with stacking of data objects). Regardless of the number of dimensions of the canvas space, the canvas space can be rendered on a two-dimensional display.

FIG. 1 is a block diagram illustrating an example software architecture (100) for a data object classification tool (DOCT) using feature generation through crowdsourcing, in accordance with an example embodiment of the disclosure. Referring to FIG. 1, a client computing device (e.g., smart phone or other mobile computing device such as device 1100 in FIG. 11) can execute software organized according to the architecture 100 to provide data object classification functionalities.

Figure 7:
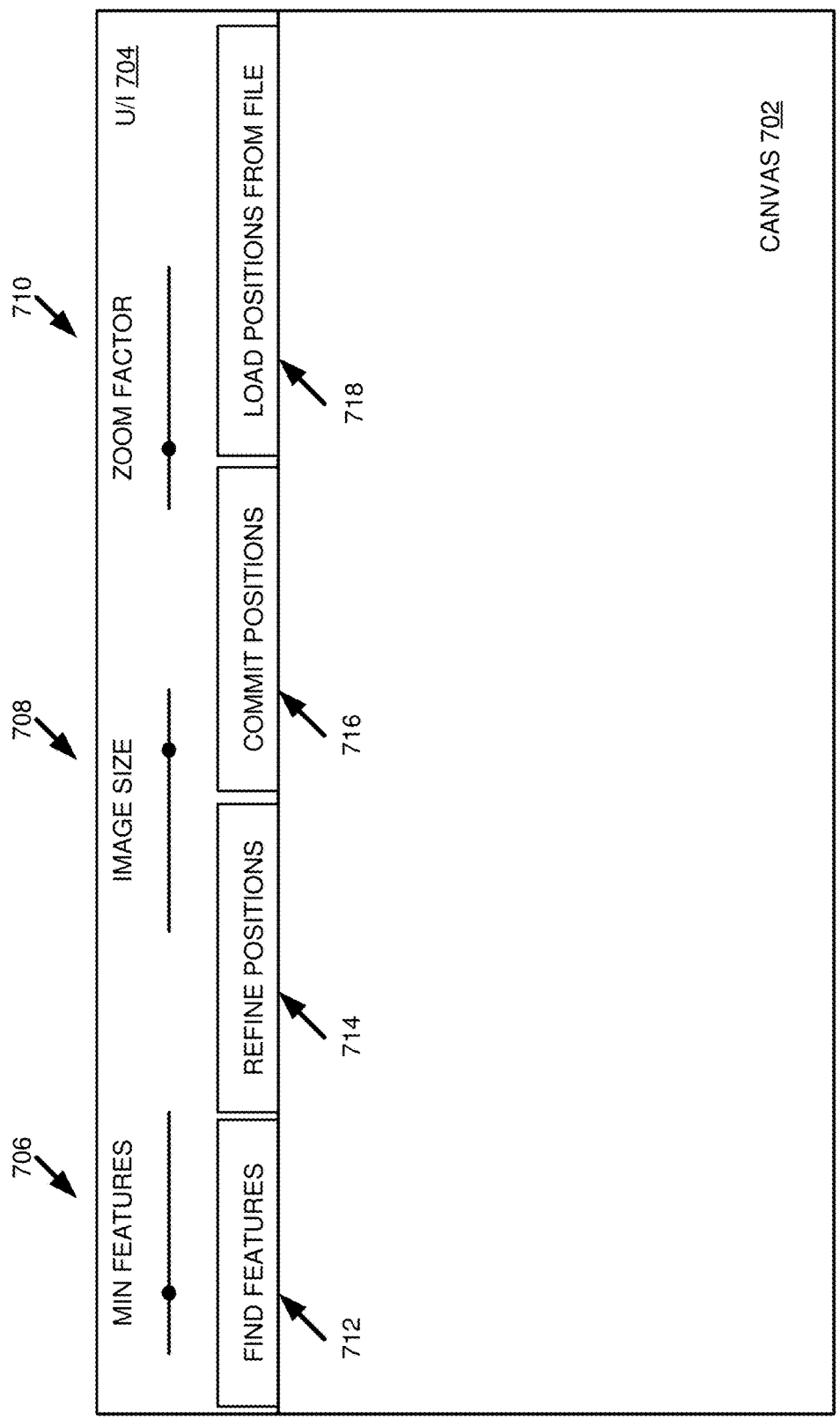
FIG. 7 illustrates an example user interface (U/I) which may be used during data object classification by the DOCT of FIG. 1, in accordance with an example embodiment of the disclosure.

The architecture 100 includes a device operating system (OS) 118 and a data object classification tool (DOCT) 102. In FIG. 1, the device OS 118 includes components for rendering 120 (e.g., rendering visual output to a display, generating voice output for a speaker), components for networking 126, and a user interface (U/I) engine 128. The U/I engine 128 may be used to generate one or more user interfaces (e.g., as illustrated in FIG. 7) in connection with data object classification functionalities performed by the DOCT 102. The user interfaces may be rendered on display 122, using the rendering component 120. Input received via a user interface generated by the engine 128 may be communicated to the classification engine 104. The device OS 118 manages user input functions, output functions, storage access functions, network communication functions, and other functions for the device 1100. The device OS 118 provides access to such functions to the DOCT 102.

The DOCT 102 may comprise suitable logic, circuitry, interfaces, and/or code and may be operable to provide data object classification functionalities using feature generation through crowdsourcing, as explained herein. The DOCT 102 may comprise a classification engine 104, a canvas rendering engine 106, a features engine 110, and a dimensionality reduction engine 108.

The classification engine 104 may comprise suitable logic, circuitry, interfaces, and/or code and may be operable to receive user input associated with one or more data objects on a canvas space (e.g., canvas 124 viewed on display 122). The user input can be tactile input such as touchscreen input, button presses or key presses or voice input. The device OS 118 includes functionality for recognizing taps, finger gestures, etc. to a touchscreen from tactile input, recognizing commands from voice input, button input or key press input, and creating messages that can be used by the DOCT 102 or other software. In some implementations, the user input may specify spatial position input (e.g., new spatial positions or X-Y coordinates of one or more data objects that the user has moved on the canvas, or confirmation of spatial positions of one or more data objects that the user has "circled" or otherwise selected on the canvas) as well as an instruction to commit spatial positions (e.g., a user may indicate via the instruction that data object positions displayed on a canvas are acceptable and the spatial coordinates of each data object may be committed/stored in a features profile for that object).

The classification engine 104 may also access one or more features profiles for data objects, using the features engine 110. In some implementations, the classification engine may store new features in a features profile (e.g., after receiving an instruction to commit spatial positions, the current spatial coordinates of a data object in the canvas 124 may be stored as one or more new features in a features profile for each data object, as stored by the features database 112). The classification engine 104 may also acquire one or more existing features from a features profile stored by the database 112 and communicated via the features engine 110. Even though features-related communication is performed using the features engine 110, the present disclosure may not be limited in this regard. The classification engine 104 may be operable to communicate directly with the features database 112 to acquire features or store new features for one or more data objects inside the canvas 124.

In response to receiving input designating one or more data object spatial positions, the classification engine 104 may be further operable to generate a rule set (or classifier set) 105 explaining the new data object spatial positions (i.e., the new positions of data objects after a user moves/groups at least two data objects on the canvas). More specifically, the rule set 105 may use those features (e.g., among abstract, machine-generated features 114 and/or semantic features 116) that explain the new spatial positions received based on the user input. (It is assumed that the user places data objects closer together in the canvas space because those data objects are similar in the latent mental model applied by the user.) As part of generating the rule set, the classification engine may determine correlations between (a) values of features in a set of features associated with each of at least two data objects that have been moved/grouped together by a user, and (b) the changed spatial coordinates for the at least two data objects. The rule set 105 may then be calculated based on the determined correlations. In other instances, the classification engine may determine one or more common features among a set of features associated with co-located data objects (e.g., at least two of the data objects are grouped together and are, therefore, co-located). The rule set 105 may then be calculated based on the determined common features. In general, if the user makes a "pile" of data objects, the classification engine attempts to find features that explain the user's input pattern. After the rule set is calculated, the classification engine may apply the rule set to remaining data objects (e.g., one or more of the data objects that were not moved by a user) so as to assign spatial coordinates to such data objects, re-arranging them on the canvas. After the user commits the canvas, the spatial coordinates for each data object on the "committed" canvas may be stored as one or more new (semantic) features within the database 112 (e.g., a single new semantic feature for X-Y spatial coordinates for the data object, or as two new semantic features for X and Y spatial coordinates, respectively, for the data object).

The features engine 110 may comprise suitable logic, circuitry, interfaces, and/or code and may be operable to generate and manage feature profiles for one or more data objects. More specifically, the features engine 110 may generate or receive abstract (or machine-generated) features 114 for one or more of the data objects presented inside the canvas 124. The machine-generated features for data objects can be generated by any of various available feature generation tools. Different feature generation tools available to the public can be used for different types of data objects (e.g., Lighthouse, Inspire, or various natural language processing kits for text data objects).

Different types of data objects can have different sets of features. For example, image data objects can have a first feature set, email data objects can have a second feature set, raw text data objects can have a third feature set, audio data objects can have a fourth feature set, and so on. If data objects in the canvas space include different types of data objects with different feature sets, based on the spatial positioning input provided by the user, the classification engine can determine which features of the respective feature sets are correlated, and which features of the respective feature sets explain spatial positioning input specified by the user. For example, the classification engine can determine which features of an image feature set are correlated with which features of a text feature set, and which features of the image and text feature sets that explain spatial positioning input from the user. A rule set can include rules for multiple feature sets, such that data objects of various types are classified when the rule set is applied.

The abstract features 114 may be stored as part of a features profile within the database 112. In some instances, the features engine 110 may include a text parsing engine (not illustrated in FIG. 1), which may be used to parse and interpret text (e.g., in a text file or a picture file of a text-containing object such as an article). The features database 112 may also include semantic (or relative positional) features 116, which are based on a meaning or mental model applied by a user. The semantic features 116 may include, e.g., spatial coordinates specified by a user and/or application of the rule set 105, based on the new features input received from the classification engine 110.

The dimensionality reduction engine 108 may comprise suitable logic, circuitry, interfaces, and/or code and may be operable to reduce the number of abstract features 114 and/or semantic features 116 for one or more of the data objects, if the number of features per object exceeds a threshold number. In some embodiments, the dimensionality reduction engine 108 may use principle component analysis, non-negative matrix factorization, sparse coding, and/or one or more other algorithms to perform dimensionality reduction.

The canvas rendering engine 106 may comprise suitable logic, circuitry, interfaces, and/or code and may be operable to process data object positional information (e.g., spatial positions or coordinates) received from the classification engine 104, and render a view of the canvas 124 on display 122 (using the rendering component 120 within the OS 118).

Alternatively, the data object classification tool 102 includes more or fewer modules. A given module can be split into multiple modules, or different modules can be combined into a single module. For example, the classification engine 104 can be split into multiple modules that control different aspects of data object classification, or the classification engine 104 may be combined with the canvas rendering engine 106, the features engine 110, and/or the dimensionality reduction engine 108. Functionality described with reference to one module (e.g., data object classification) can in some cases be implemented as part of another module.

Figure 2:
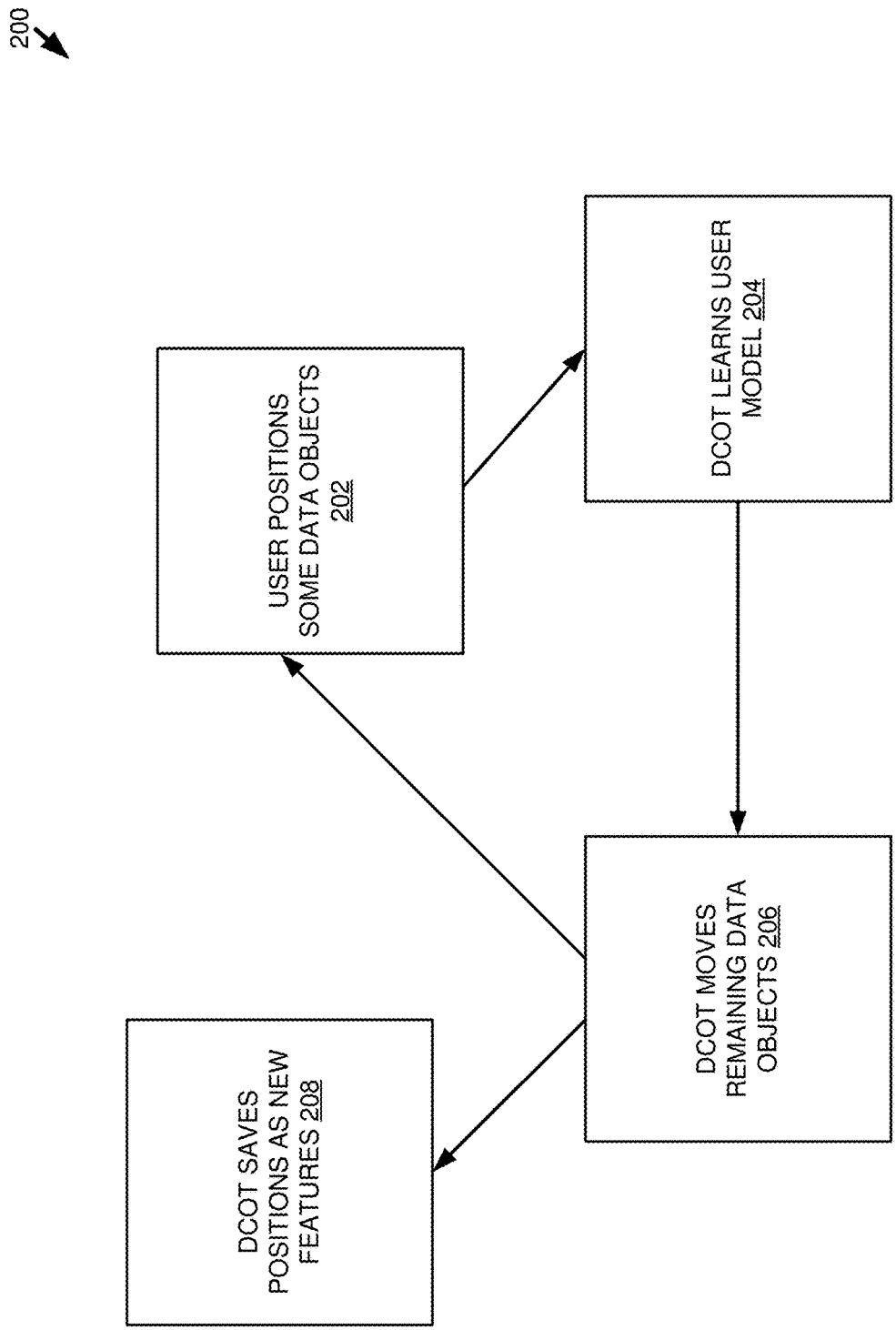
FIG. 2 is a block diagram illustrating example steps for generating a rule set for features based on crowdsourced semantic relations, in accordance with an example embodiment of the disclosure.
Figure 3:
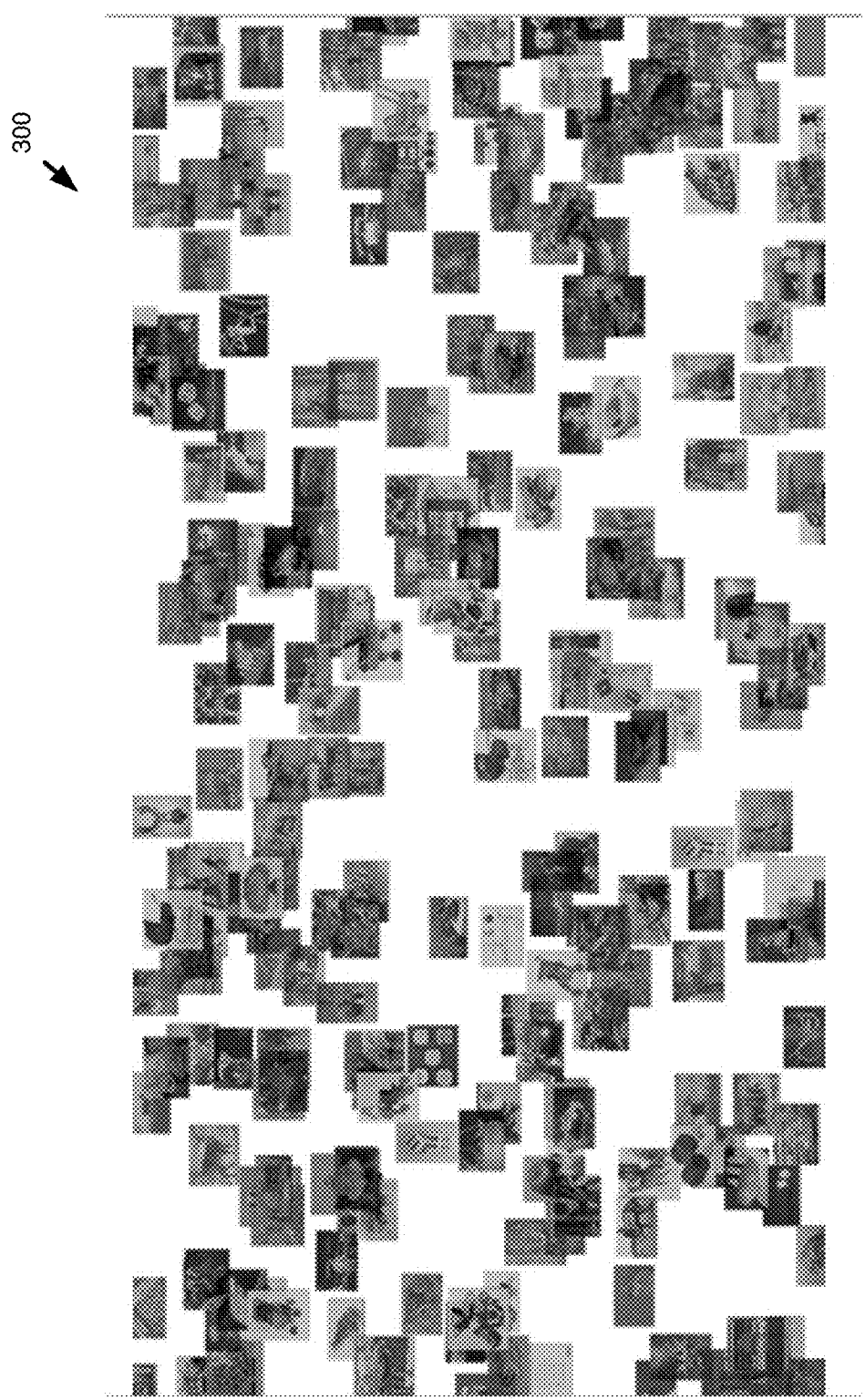
FIGS. 3-6 illustrate a two-dimensional canvas space with data objects during various stages of classifying and arranging the data objects, in accordance with an example embodiment of the disclosure.
Figure 4:
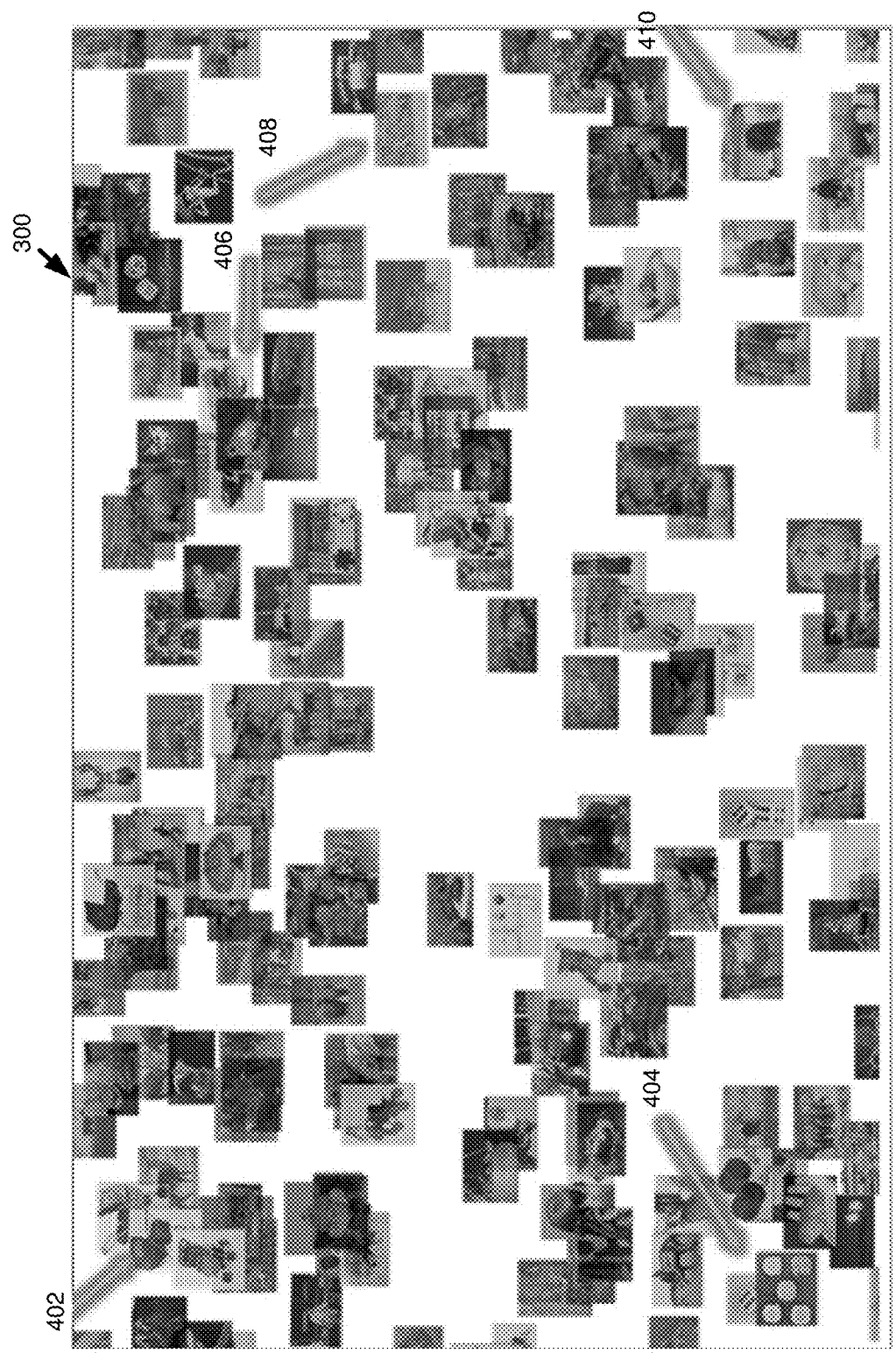

FIG. 2 is a block diagram 200 illustrating example steps for generating a rule set for features based on crowdsourced semantic relations, in accordance with an example embodiment of the disclosure. Referring to FIG. 2, the example steps in diagram 200 may be implemented in connection with a plurality of data objects placed on a canvas, as illustrated in FIGS. 3-6. FIGS. 3-6 illustrate a two-dimensional canvas space with data objects during various stages of classifying and arranging the data objects, in accordance with an example embodiment of the disclosure. Referring to FIGS. 2-6, a user may position (at 202) data objects within canvas 300. For example, as seen in FIG. 3, a random arrangement of data objects (image files) associated with deer, dice, elephants, frogs, and prams is presented. Referring to FIG. 4, a user may move 10 of the data objects (in FIG. 4, the movements are illustrated with pink arrows, which are not rendered in the canvas space itself) as follows: three objects of prams 402 are grouped together, two objects of dice 404 are grouped together, two objects of frogs 406 are grouped together, one object of deer 408 is moved next to several other objects of deer, and two objects of elephants 410 are grouped together.

At 204, the DOCT 102 may use features information for the ten moved data objects to estimate the underlying user model (i.e., a classifier set or a rule set 105) that explains the changed spatial coordinates of the moved ten data objects. (It is assumed that the user places data objects closer together in the canvas space because they are similar in the underlying model applied by the user.) For example, the classification engine 104 may also acquire the features profiles for the ten moved data objects from the features database 112 via the features engine 110. The classification engine 104 may then generate the rule (or classifier) set 105 explaining the new spatial positions (i.e., the new positions of the ten data objects after they have been moved on the canvas 300). More specifically, the rule set 105 may determine which features (e.g., abstract features 114 and/or semantic features 116) explain the new spatial positions received based on the user input. As part of generating the rule set, the classification engine may determining correlations between (a) values of features in a set of features associated with each of at least two data objects that have been moved/grouped together by a user, and (b) the changed spatial coordinates for the at least two data objects. The rule set may then be calculated based on the determined correlations.

For example, the new spatial coordinates (or positions) of moved objects may be designated with X, and the objects' features may be designated with F. The classification engine 104 may determine the rule (or classifier) set by determining which features (F) explain the new spatial coordinates (or positions, X) of the moved data objects. More specifically, the classification engine 104 may determine which features F, after moving the data objects, minimize the conditional entropy function of $$\operatorname*{argmin}_{\{F\}} H(X \mid F).$$

Put another way, the classification engine 104 may learn the user's model and determine the rule set by determining which features (F) best explain the positions of the moved data objects by minimizing the above conditional entropy function.

After determining the rule set 105, the classification engine 104 may apply the rule set to the remaining data objects in the canvas 300 so that the remaining data objects are moved on the canvas (e.g., at 206), based on the rule set 105, to new spatial coordinates. For example, the classification engine 104 may apply the determined rule set so that the new spatial coordinates (X) of the moved remaining objects are set according to the extracted features (F) of the rule set, which is expected, e.g., to minimize the conditional entropy function of $$\operatorname*{argmin}_{\{X\}} H(X \mid F)$$

for the data objects. In addition to the conditional entropy function specified above, the classification engine 104 may also use other measures (or functions) for determining the rule set and extracting semantic features (e.g., spatial parameters or coordinates). Such measures/functions may include mutual information measure, "Random Forest" function, a "Decision Tree" function, or other similar functions.

Figure 5:
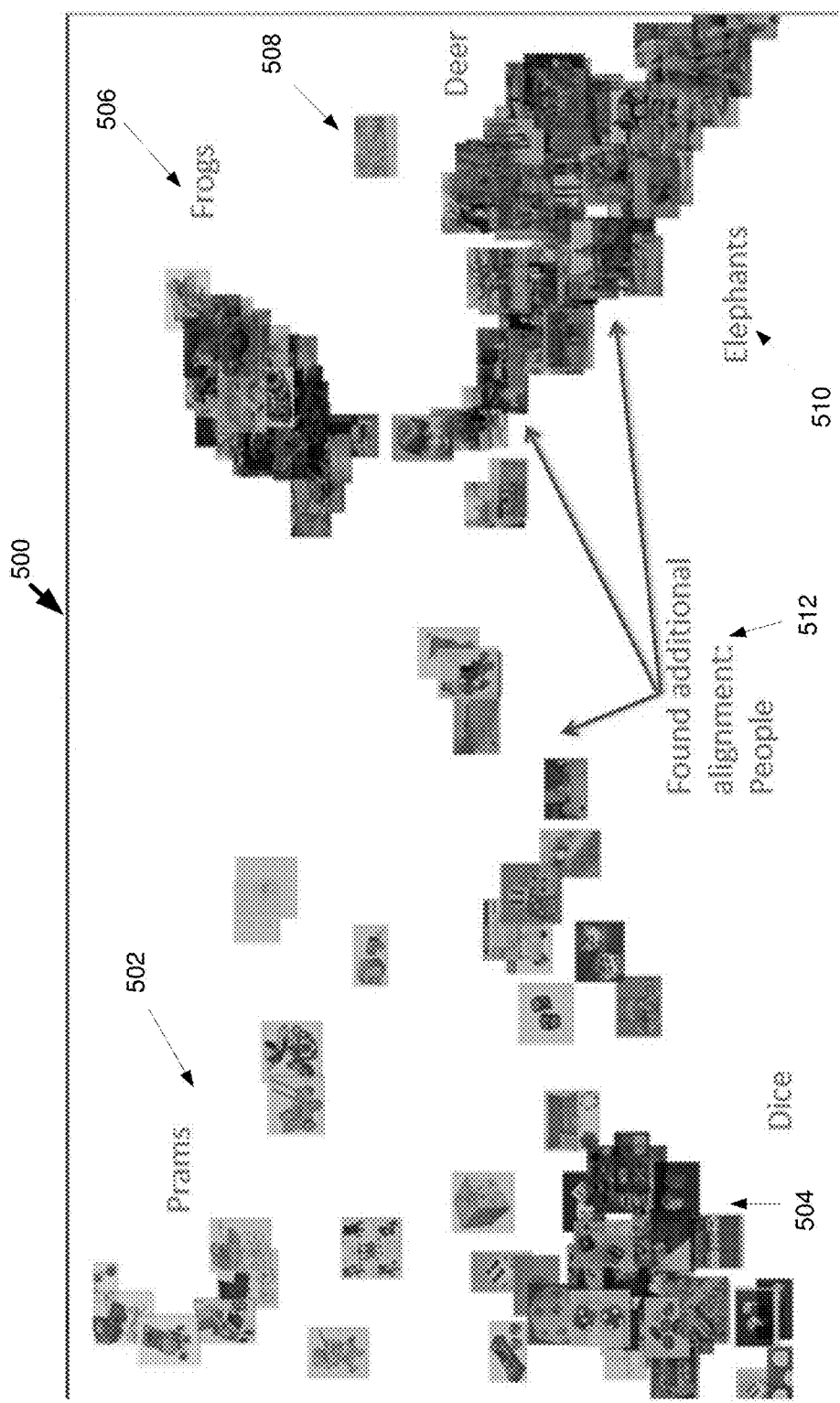

In other instances, the classification engine may determine one or more common features among a set of features associated with co-located data objects (e.g., at least two of the data objects are grouped together and are, therefore, co-located). The rule set 105 may then be calculated based on the determined common features. After the rule set is calculated, the classification engine may apply the rule set to remaining data objects (e.g., one or more of the data objects that were not moved by a user) so as to assign spatial coordinates to such data objects, re-arranging them on the canvas. The re-arranged canvas 300 can be seen as canvas 500 in FIG. 5, where prams 502, dice 504, frogs 506, deer 508, and elephants 510 are arranged in groups, based on an extracted rule set. The extracted rule set has been determined based on moving the ten objects (seen in FIG. 4), inferring a mental model of having separate groupings of prams, dice, frogs, deer and elephants. However, as seen in FIG. 5, an additional alignment 512 is also performed based on a detected common feature present in data objects associated with the groupings 502-510. (The annotations shown in FIG. 5 are not rendered as part of the canvas space, nor do they typically correspond to features in the features database, which include abstract, machine-generated features and semantic, relative positional features. Rather, the annotations shown in FIG. 5 illustrate that the DCOT determines a rule set that uses one or more features to explain a mental model applied by a user. A user could add annotations as shown in FIG. 5.) The user may then repeat steps 202-206 by moving/positioning additional data objects (e.g., further separating data objects from grouping 512 to one of the groupings 502-510).

Figure 6:
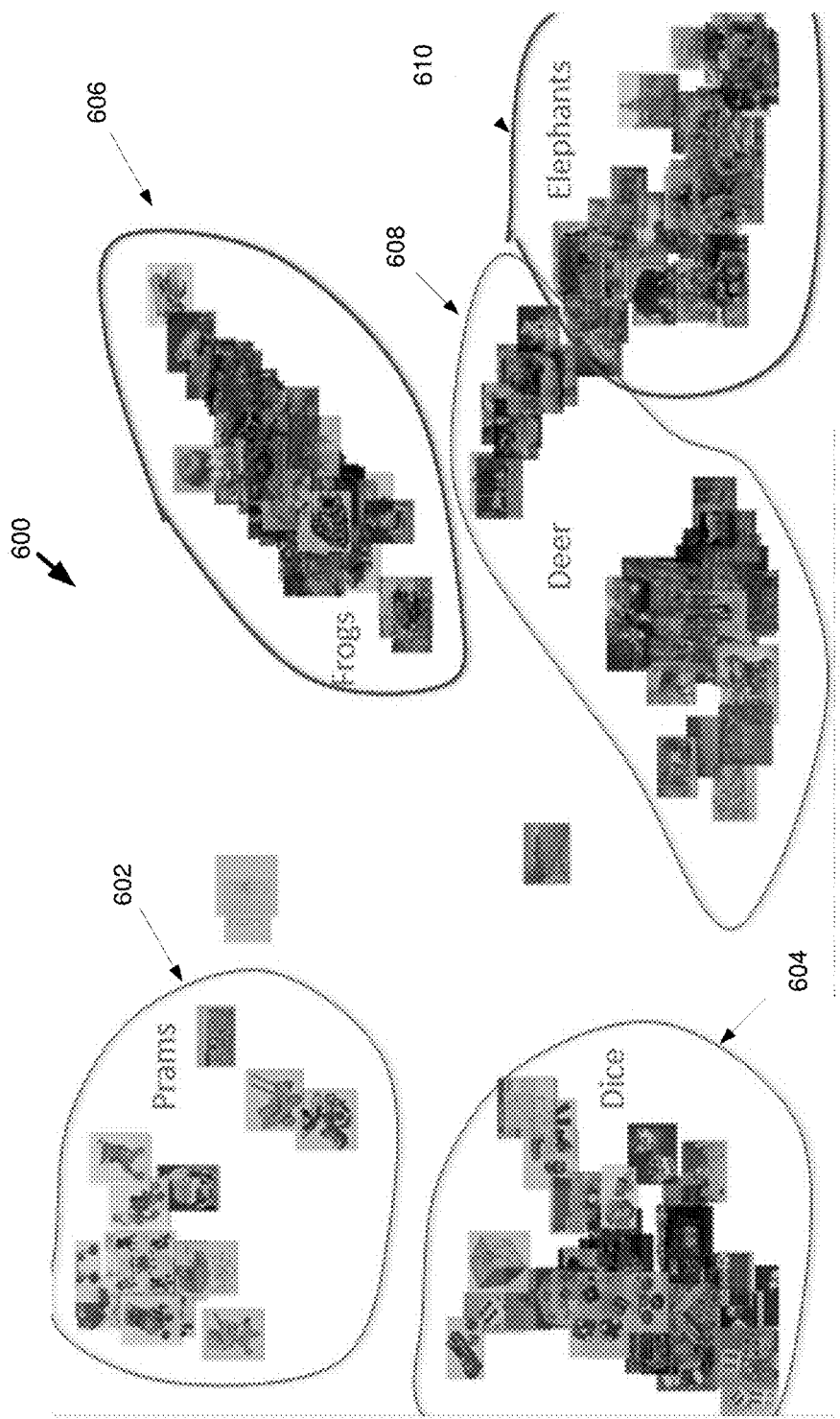

A re-arranged canvas 600 (after several rounds of moving objects, determining a rule set and applying the rule set to remaining data objects) is illustrated in FIG. 6. As seen in FIG. 6, five distinct groupings of prams 602, dice 604, frogs 606, deer 608, and elephants 610 are present in the canvas 600. (As in the example of FIG. 5, the annotations shown in FIG. 6 are not rendered as part of the canvas space, nor do they typically correspond to features in the features database, although a user could add annotations as shown in FIG. 6.) The user may then commit (or save) the canvas 600. After the user commits the canvas, the spatial coordinates for each data object on the "committed" canvas 600 may be stored as new (semantic) features within the database 112 (e.g., as new semantic features 116).

FIG. 7 illustrates an example user interface (U/I) 704, which may be used during data object classification by the DOCT of FIG. 1, in accordance with an example embodiment of the disclosure. Referring to FIG. 7, the U/I 704 may be used in connection with canvas 702 (which may be the same as any other canvas discussed herein). The U/I 704 may include input selectors (e.g., slider bars) 706-710 and action buttons 712-718. Slider bar 706 may be used to select the number of features from a set of available features per item, which may be used for data object classification, including generating the rule set. In an example implementation, the DOCT 102 may also comprise a feature rating engine (e.g., as part of the features engine 110 or as a separate engine; not illustrated in FIG. 1). The features rating engine may rate the features within a feature set for each data object, and may rank the features in the set based on popularity or frequency of use during rule set calculation. The slider bar 706 may be used to select a top-ranked number of features from an available features set for a data object.

The slider bar 708 may be used to set an image size of the data objects (i.e., the data object icons) appearing on the canvas. The slider bar 710 may be used to set a zoom factor for a zoomed view of a selected data object. The action button "Find Features" 712 may be used to find common features after two or more of the data objects are moved on the canvas, determine the rule set and re-arrange a remaining set of data objects on the canvas based on the determined rule set (i.e., action button 712 may trigger steps 204-206 in FIG. 2).

The action button "Refine Positions" 714 may be used after the "Find Features" button to apply the determined rule set again for purposes of refining the data object positions in the canvas. The action button "Commit Positions" 716 may be used to trigger storing of the current spatial coordinates of the data objects as new (semantic) features 116 in the feature set of each data object (i.e., action button 716 triggers step 208 in FIG. 2). Action button "Load Positions from File" 718 may be used to set up a specific canvas scenario, with specific spatial coordinates for the data objects loaded from a file.

Figure 8:
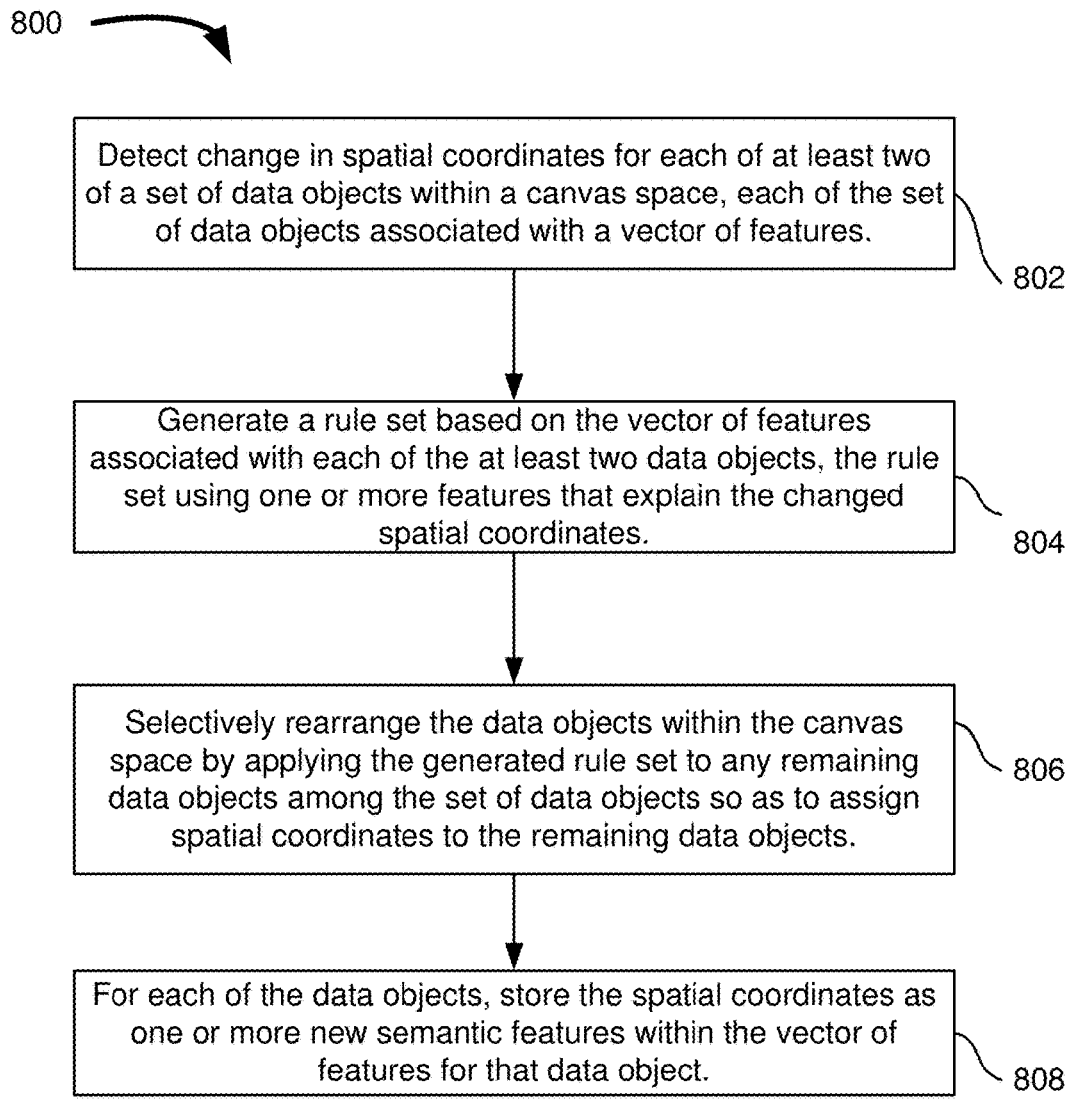
FIGS. 8-10 are flowcharts of example methods for classifying data, in accordance with example embodiments of the disclosure.
Figure 9:
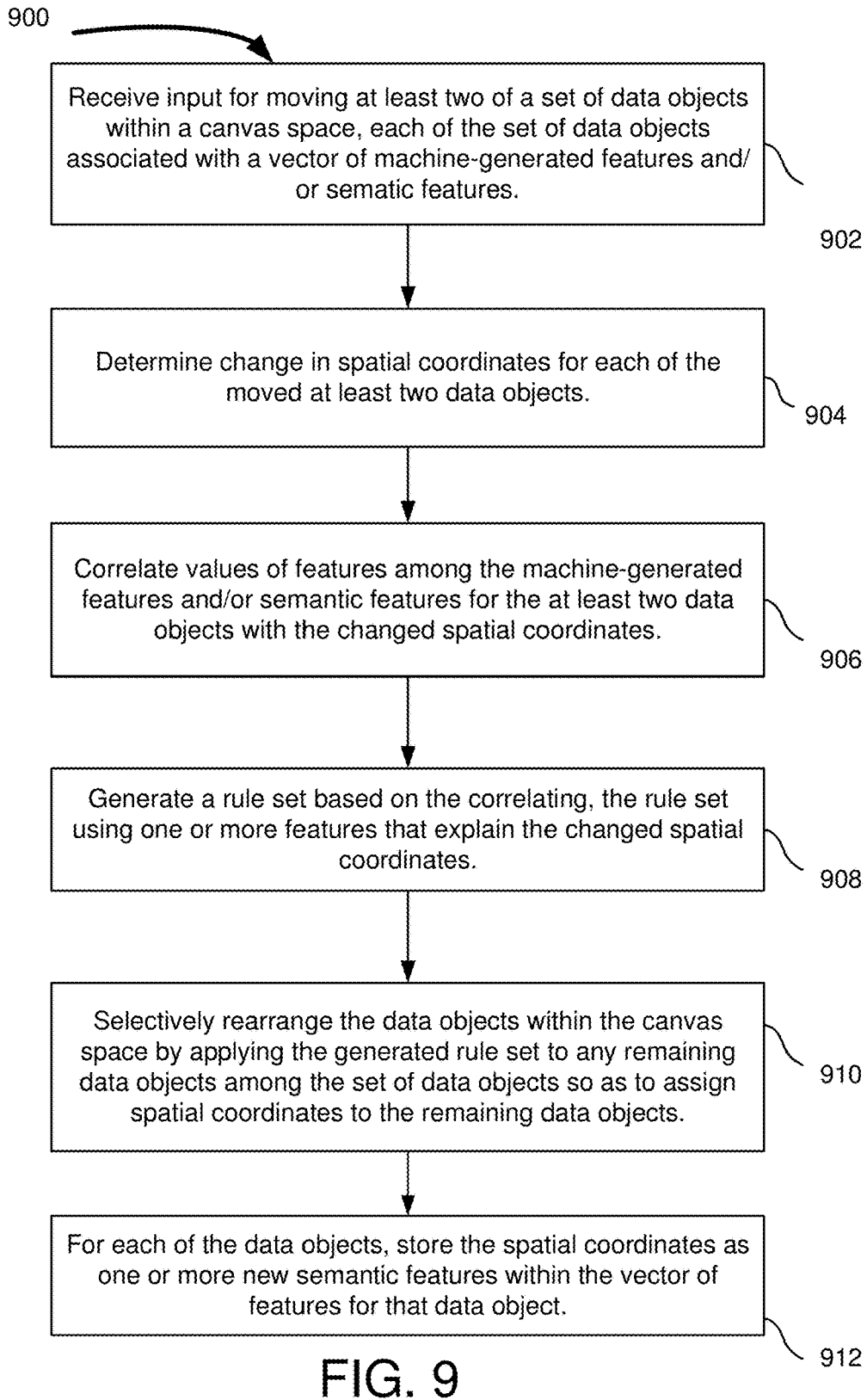
Figure 10:
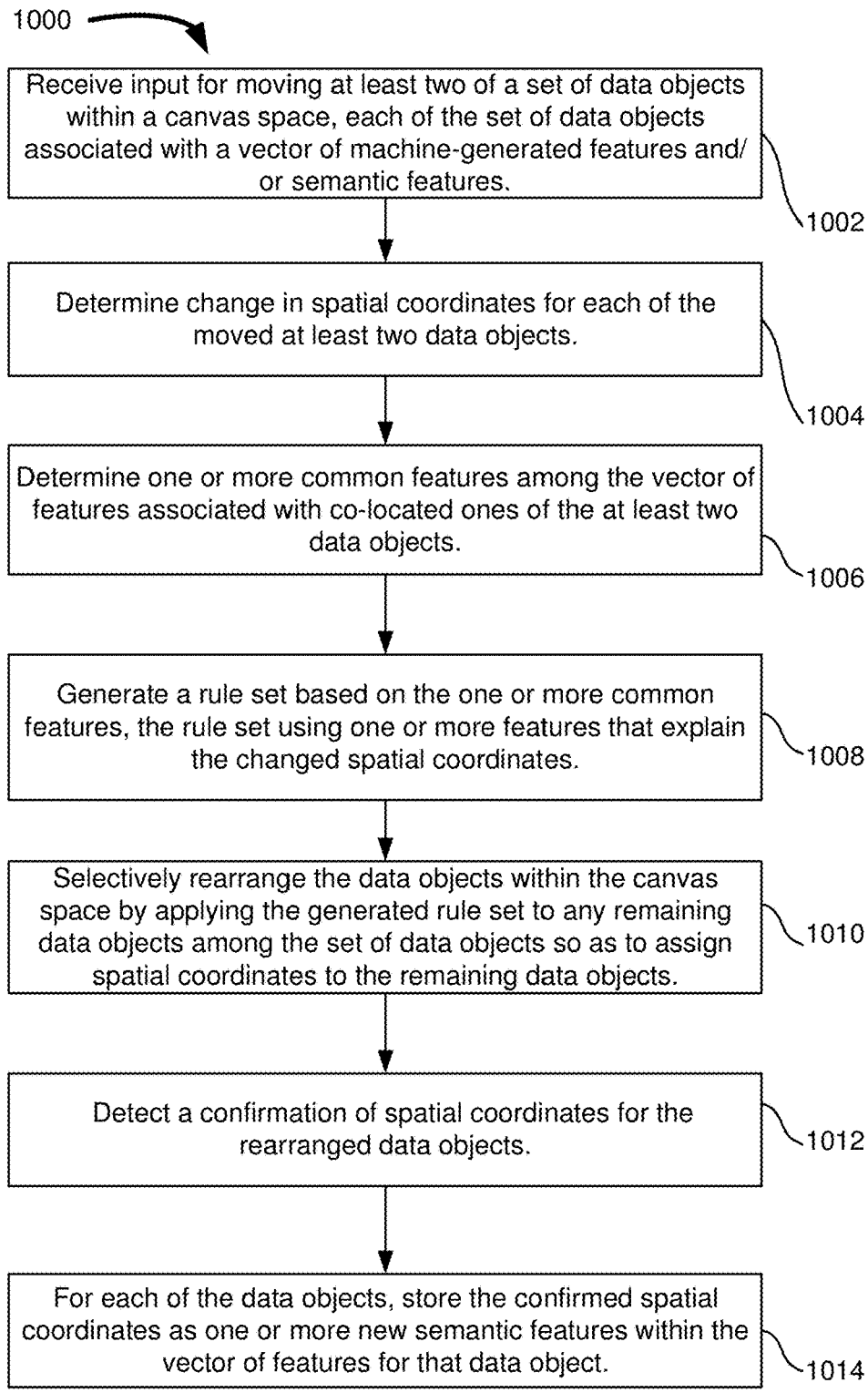

FIGS. 8-10 are flowcharts of example methods for classifying data, in accordance with example embodiments of the disclosure. Referring to FIGS. 1-6 and 8, the example method 800 may start at 802, when change in spatial coordinates for each of at least two of a set of data objects within a canvas space such as a two-dimensional canvas space may be detected. The set of data objects can be all data objects represented in a features database 112, a subset thereof, all data objects rendered on the canvas space, or a subset thereof. Each of the set of data objects associated with a vector of features. The vector of features can include values for 100, 1000, 2000 or some other number of features. The features can include machine-generated features and/or semantic features (previously assigned by the DOCT). The number of features can increase as semantic features (positions) are added. For example, a user may move ten of the data objects on canvas 300, as seen in FIG. 4, or move some other number of the data objects on the canvas space. Each of the data objects on the canvas is associated with a set (vector) of features stored in the features database 112. The classification engine receives the new spatial positions based on the user input, which positions indicate the coordinates of the data objects that have been moved by the user or the coordinates of data objects that the user has "circled" or otherwise selected on the canvas.

At 804, the classification engine 104 may generate a rule set 105 based on the vector of features associated with each of the at least two data objects. For example, for the example shown in FIG. 4, the rule set 105 may be based on the features associated with the ten moved data objects. More generally, the rule set 105 may use one or more features that explain the changed spatial coordinates of the moved data objects. At 806, the classification engine 104 may selectively rearrange the data objects within the canvas space (e.g., 300) by applying the generated rule set 105 to any remaining data objects among the set of data objects so as to assign spatial coordinates to the remaining data objects (e.g., as seen in FIGS. 5-6). At 808 (e.g., after a user presses the "commit positions" button 716), the classification engine 104 may store, for each of the data objects in the canvas (e.g., 300, 500, or 600), the spatial coordinates of the data objects as one or more new semantic features within the vector of features for that data object (e.g., a single new semantic feature for X-Y spatial coordinates or two new semantic features for X and Y spatial coordinates, respectively, as part of the semantic features 116 within the database 112).

For example, suppose a vector of features initially includes 2000 machine-generated features. After a first round of user input and feedback, the vector includes two new semantic features (features 2001 and 2002) for X and Y spatial coordinates, respectively. After a second round of user input and feedback (potentially using any of the 2002 features when generating a rule set), the vector includes two more semantic features (features 2003 and 2004) for X and Y spatial coordinates, respectively. In a third round of user input and feedback, the previously assigned semantic features 2001-2004 may be given significant weight when generating a rule set (if the latent mental model applied in the third round is similar to an earlier latent mental model), or be given little weight (if the latent mental models are very different).

Referring to FIGS. 1-6 and 9, the example method 900 may start at 902, when the DOCT 102 may receive input for moving at least two of a set of data objects within a canvas space such as a two-dimensional canvas space. The set of data objects can be all data objects represented in a features database 112, a subset thereof, all data objects rendered on the canvas space, or a subset thereof. Each of the set of data objects is associated with a vector of machine-generated features and/or semantic features. For example, a user may move ten of the data objects on canvas 300, as seen in FIG. 4, or move some other number of the data objects on the canvas space. Each of the data objects on the canvas is associated with a set (vector) of features stored in the features database 112. The classification engine receives the new spatial positions based on the user input, which positions indicate the coordinates of the data objects that have been moved by the user. At 904, the classification engine 104 may determine a change in the spatial coordinates for each of the moved at least two data objects (e.g., change in spatial coordinates is determined for the ten moved data objects in canvas 300).

At 906, the classification engine 104 may correlate values of features among the machine-generated features (e.g., abstract features 114) and/or semantic features (e.g., 116) for the at least two data objects with the changed spatial coordinates. At 908, the classification engine 104 may generate a rule set (e.g., 105) based on the correlating. The rule set 105 may use one or more features that explain the changed spatial coordinates (e.g., features that explain the changed spatial coordinates of the moved ten data objects). At 910, the classification engine may selectively rearrange the data objects within the canvas space (e.g., 300) by applying the generated rule set 105 to any remaining data objects among the set of data objects so as to assign spatial coordinates to the remaining data objects. For example, after the rule set 105 is calculated/determined based on the moved data objects, the rule set may be applied to the remaining data objects on canvas 300 so that the data objects are assigned new spatial coordinates, and the canvas (e.g., 500) includes the re-arranged data objects. At 912, the classification engine 104 may store, for each of the data objects in the canvas (e.g., 300, 500, or 600), the spatial coordinates of the data objects as one or more new semantic features within the vector of features for that data object (e.g., as part of the semantic features 116 within the database 112).

Referring to FIGS. 1-6 and 10, the example method 1000 may start at 1002, when the DOCT 102 may receive input for moving at least two of a set of data objects within a canvas space such as a two-dimensional canvas space. The set of data objects can be all data objects represented in a features database 112, a subset thereof, all data objects rendered on the canvas space, or a subset thereof. Each of the set of data objects is associated with a vector of machine-generated features and/or semantic features. For example, a user may move ten of the data objects on canvas 300, as seen in FIG. 4, or move some other number of the data objects on the canvas space. Each of the data objects on the canvas is associated with a set (vector) of features stored in the features database 112. The classification engine receives the new spatial positions based on the user input, which positions indicate the coordinates of the data objects that have been moved by the user. At 1004, the classification engine 104 may determine a change in the spatial coordinates for each of the moved at least two data objects (e.g., change in spatial coordinates is determined for the ten moved data objects in canvas 300).

At 1006, the classification engine may determine one or more common features among the vector of features associated with co-located ones of the at least two data objects. For example, the classification engine may obtain the feature sets for each of the two data objects of dice 404, which are co-located (as seen in FIG. 4). The classification engine may then determine one or more common features among the feature sets for the two co-located data objects. At 1008, the classification engine 104 may generate a rule set (e.g., 105) based on the one or more common features, the rule set using one or more features that explain the changed spatial coordinates.

At 1010, the classification engine may selectively rearrange the data objects within the canvas space (e.g., 300) by applying the generated rule set 105 to any remaining data objects among the set of data objects so as to assign spatial coordinates to the remaining data objects. For example, after the rule set 105 is calculated/determined based on the moved data objects, the rule set may be applied to the remaining data objects on canvas 300 so that the data objects are assigned new spatial coordinates, and the canvas (e.g., 500) includes the re-arranged data objects. At 1012, the classification engine 104 may detect a confirmation of spatial coordinates for the rearranged data objects. For example, the user may have activated the "commit positions" button 716 (also, step 208 in FIG. 2), which indicates a confirmation of the current spatial positions of the data objects within the canvas. At 1012, the classification engine 104 may store, for each of the data objects in the canvas (e.g., 300, 500, or 600), the spatial coordinates of the data objects as one or more new semantic features within the vector of features for that data object (e.g., as part of the semantic features 116 within the database 112).

Figure 11:
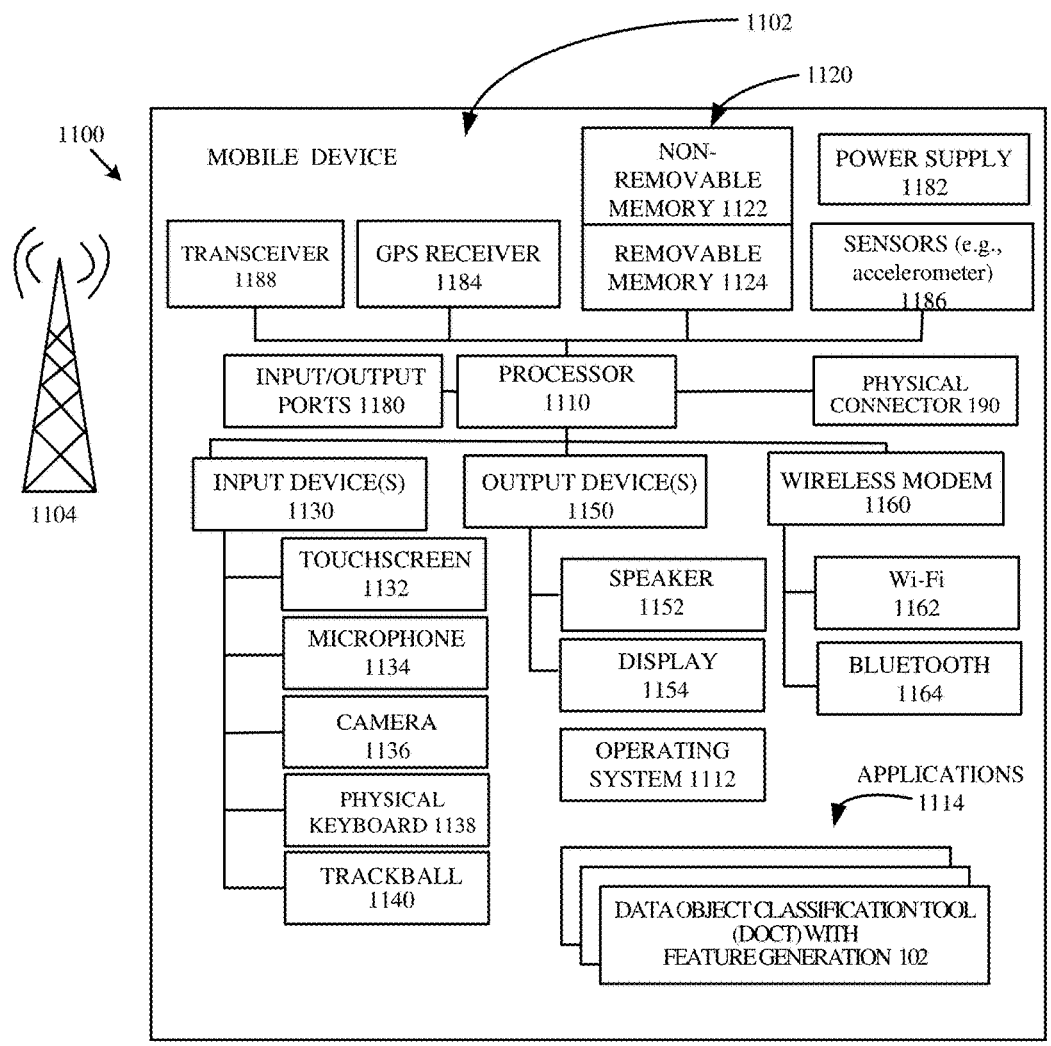
FIG. 11 is a block diagram illustrating an example mobile computing device in conjunction with which innovations described herein may be implemented.

FIG. 11 is a block diagram illustrating an example mobile computing device 1100 in conjunction with which innovations described herein may be implemented. The mobile device 1100 includes a variety of optional hardware and software components, shown generally at 1102. In general, a component in the mobile device can communicate with any other component of the device, although not all connections are shown, for ease of illustration. The mobile device 1100 can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks 1104, such as a Wi-Fi, cellular, or satellite network.

The illustrated mobile device 1000 includes a controller or processor 1110 (e.g., signal processor, microprocessor, ASIC, or other control and processing logic circuitry) for performing such tasks as signal coding, data processing (including assigning weights and ranking data such as search results), input/output processing, power control, and/or other functions. An operating system 1112 controls the allocation and usage of the components 1102 and support for one or more application programs 1114, such as a data object classification tool (DOCT) 102 with feature generation that implements one or more of the innovative features described herein. In addition to DOCT 102, the application programs 1114 can include common mobile computing applications (e.g., telephony applications, email applications, calendars, contact managers, web browsers, messaging applications), or any other computing application.

The illustrated mobile device 1100 includes memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in Global System for Mobile Communications (GSM) communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touch screen 1132 (e.g., capable of capturing finger tap inputs, finger gesture inputs, or keystroke inputs for a virtual keyboard or keypad), microphone 1134 (e.g., capable of capturing voice input), camera 1136 (e.g., capable of capturing still pictures and/or video images), physical keyboard 1138, buttons and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The mobile device 1100 can provide one or more natural user interfaces (NUIs). For example, the operating system 1112 or applications 1114 can comprise speech-recognition software as part of a voice user interface that allows a user to operate the device 1100 via voice commands.

A wireless modem 1160 can be coupled to one or more antennas (not shown) and can support two-way communications between the processor 1110 and external devices, as is well understood in the art. The modem 1160 is shown generically and can include, for example, a cellular modem for communicating at long range with the mobile communication network 1104, a Bluetooth-compatible modem 1164, or a Wi-Fi-compatible modem 1162 for communicating at short range with an external Bluetooth-equipped device or a local wireless data network or router. The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, sensors 1186 such as an accelerometer, a gyroscope, or an infrared proximity sensor for detecting the orientation and motion of device 1100, and for receiving gesture commands as input, a transceiver 1188 (for wirelessly transmitting analog or digital signals), and/or a physical connector 1190, which can be a USB port, IEEE 1394 (FireWire) port, and/or RS-232 port. The illustrated components 1102 are not required or all-inclusive, as any of the components shown can be deleted and other components can be added.

The mobile device 1100 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing, weighting of data and ranking of data) can be performed in the cloud.

Although FIG. 11 illustrates a mobile device 1100, more generally, the innovations described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the DOCT innovations described herein can be implemented with any of the connected devices as a client computing device. Similarly, any of various computing devices in the cloud or a service provider can perform the role of server computing device and deliver data to the connected devices.

Figure 12:
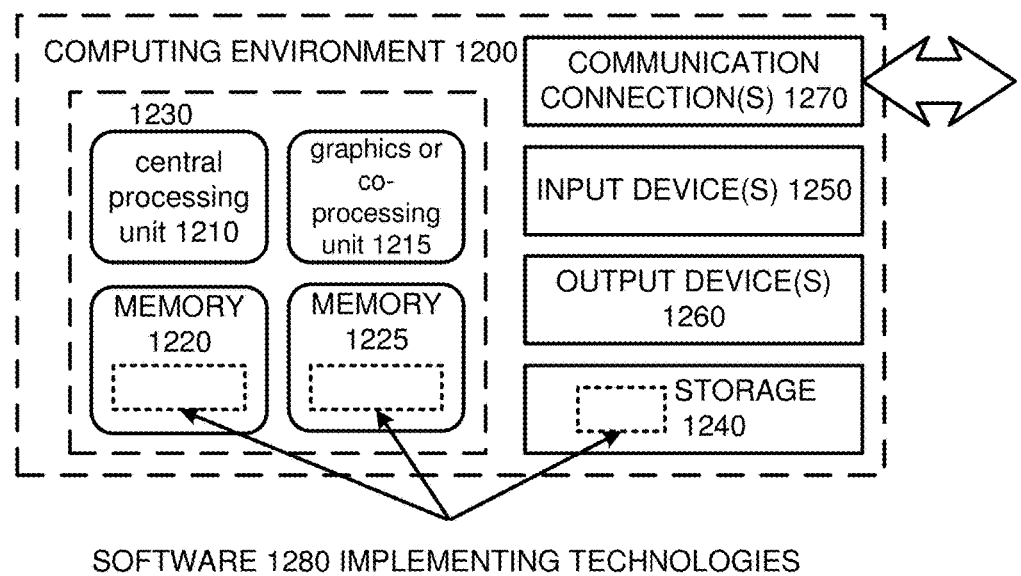
FIG. 12 is a diagram of an example computing system, in which described embodiments can be implemented.

FIG. 12 is a diagram of an example computing system, in which described embodiments can be implemented. The computing system 1200 is not intended to suggest any limitation as to scope of use or functionality, as the innovations may be implemented in diverse general-purpose or special-purpose computing systems. With reference to FIG. 12, the computing system 1200 includes one or more processing units 1210, 1215 and memory 1220, 1225 (e.g., coupled to the processing units). In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 13:
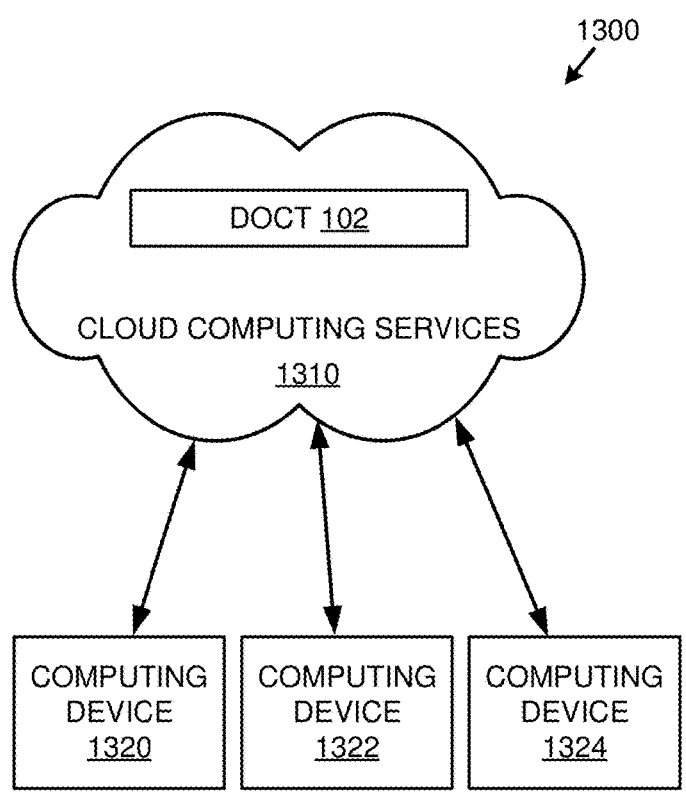
FIG. 13 is an example cloud computing environment that can be used in conjunction with the technologies described herein.

FIG. 13 is an example cloud computing environment 1300 that can be used in conjunction with the technologies described herein. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries). Additionally, the cloud computing service 1310 may implement the DOCT 102 and other functionalities described herein relating to data object classification.

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or non-volatile memory components (such as flash memory or hard drives)). By way of example and with reference to FIG. 12, computer-readable storage media include memory 1220 and 1225, and storage 1240. The term computer-readable storage media does not include communication connections (e.g., 1270) such as modulated data signals or carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

I claim:

1. In a computing device that implements a data object classification tool, a method for classifying data, the method comprising:
    detecting change in spatial coordinates for each of at least two of a set of data objects within a canvas space, each of the set of data objects associated with a vector of features, the change in spatial coordinates altering the relative positions of the at least two data objects;
    generating a rule set based on the vector of features associated with each of the at least two data objects, the rule set using one or more features that explain the changed spatial coordinates;
    selectively rearranging the data objects within the canvas space by applying the generated rule set to any remaining data objects among the set of data objects so as to assign spatial coordinates to the remaining data objects; and
    for each of the data objects, storing the spatial coordinates as one or more new semantic features within the vector of features for that data object.

2. The method according to claim 1, wherein the change in spatial coordinates is in response to receiving tactile user input for moving the at least two data objects within the canvas space.

3. The method according to claim 1, wherein the data objects comprise one or more of image data objects, audio data objects, text data objects, and video data objects.

4. The method according to claim 3, wherein different types of data objects have different definitions for the vectors of features associated with the set of data objects, respectively.

5. The method according to claim 1, further comprising:
    retrieving the vector of features associated with each of the set of data objects from a storage database.

6. The method according to claim 5, wherein, for each of the set of data objects, the retrieved vector of features for that data object has only machine-generated features.

7. The method according to claim 5, wherein, for each of the set of data objects, the retrieved vector of features for that data object has machine-generated features and at least one previously-assigned semantic feature.

8. The method according to claim 1, further comprising, as part of the generating the rule set:
    determining correlations between (a) values of features in the vector of features associated with each of the at least two data objects and (b) the changed spatial coordinates for the at least two data objects; and
    calculating the rule set based on the determined correlations.

9. The method according to claim 1, further comprising, as part of the generating the rule set:
    determining one or more common features among the vector of features associated with co-located ones of the at least two data objects; and calculating the rule set based on the determined one or more common features.

10. The method according to claim 1, wherein the generating the rule set comprises:
applying one of a regression model and an information theoretic model to extract at least one of the one or more features that explain the changed spatial coordinates.

11. The method according to claim 10, wherein:
the information theoretic model uses mutual information measure or a conditional entropy measure; and
the at least one extracted feature minimize the conditional entropy measure.

12. The method according to claim 1, further comprising:
detecting change or confirmation of spatial coordinates for each of at least one more data object of the set of data objects;
revising the rule set based on the vector of features associated with each of the at least one more data object; and
selectively rearranging the data objects within the canvas space by applying the revised rule set to any remaining data objects among the set of data objects so as to assign updated spatial coordinates to the remaining data objects.

13. The method according to claim 12, wherein the change or confirmation of spatial coordinates is in response to receiving tactile user input for moving or marking the at least one more data object within the canvas space.

14. The method according to claim 1, further comprising:
iteratively rearranging at least some of the data objects within the canvas space by applying the generated rule set to the at least some of the set of data objects so as to assign updated spatial coordinates to the at least some data objects.

15. The method according to claim 1, further comprising:
arranging a plurality of new data objects within the canvas space by applying the generated rule set so as to assign spatial coordinates to the new data objects.

16. A computer-readable storage having instructions thereon that when executed cause a computing system to perform a method for classifying data, the method comprising:
receiving first user input for moving at least a first data object within a canvas space, the at least a first data object associated with a first vector of machine-generated features and/or semantic features;
receiving second user input for moving at least a second data object within the canvas space and relative to the first data object, the at least a second data object associated with a second vector of machine-generated features and/or sematic features;
determining change in spatial coordinates that alters relative positions of the at least a first data object and the at least a second data object resulting from the first and second user input;
correlating values of features among the machine-generated features and/or semantic features for the at least a first and at least a second data objects with the changed spatial coordinates;
generating a rule set based on the correlating, the rule set using one or more features that explain the changed spatial coordinates;
selectively rearranging the data objects within the canvas space by applying the generated rule set to any remaining data objects, wherein remaining data objects are data objects other than the at least a first data object and the at least a second data object, among the set of data objects so as to assign spatial coordinates to the remaining data objects; and
for each of the data objects, storing the spatial coordinates as one or more new semantic features within the vector of features for that data object.

17. The computer-readable storage according to claim 16, wherein the method further comprises:
detecting a confirmation of the rearranged data objects; and
storing the spatial coordinates upon detecting the confirmation.

18. The computer-readable storage according to claim 16, wherein the method further comprises:
receiving another input for moving at least one more of the set of data objects within the canvas space, the moved at least one data object associated with new spatial coordinates.

19. The computer-readable storage according to claim 18, wherein the method further comprises:
updating the rule set based on the vector of features associated with the at least one more data object; and
selectively rearranging the data objects within the canvas space by applying the updated rule set to any remaining data objects among the set of data objects so as to assign new spatial coordinates to the remaining data objects.

20. A computing device that includes a processor and a memory, the computing device implementing a data object classification tool comprising:
a U/I engine configured to receive:
first user input for moving at least a first data object of a set of data objects within a canvas space, each of the set of data objects associated with a vector of machine-generated features and/or semantic features; and
second user input for moving at least a second data object of the set of data objects within the canvas space and relative to the at least a first data object;
a classification engine configured to:
determine change in spatial coordinates that alter relative positions for each of the moved at least a first and at least a second data objects resulting from the first and second user input;
determine one or more common features among the vector of features associated with co-located ones of the at least a first and at least a second data objects;
generate a rule set based on the one or more common features, the rule set using one or more features that explain the changed spatial coordinates;
a canvas rendering engine configured to selectively rearrange the data objects within the canvas space by applying the generated rule set to any remaining data objects, wherein remaining data objects are data objects other than the at least a first data object and the at least a second data object, among the set of data objects so as to assign spatial coordinates to the remaining data objects;
the U/I engine being further configured to detect a confirmation of spatial coordinates for the rearranged data objects; and
a features engine configured to store, for each of the data objects, the confirmed spatial coordinates as one or more new semantic features within the vector of features for that data object.

* * * * *